(12) United States Patent
Ritchie et al.

(10) Patent No.: US 7,941,451 B1
(45) Date of Patent: May 10, 2011

(54) DYNAMIC PRECONDITIONING OF A B+ TREE

(75) Inventors: Roger V. Ritchie, Colorado Springs, CO (US); Kelsey L. Bruso, Minneapolis, MN (US); James M. Plasek, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 215 days.

(21) Appl. No.: 11/506,224

(22) Filed: Aug. 18, 2006

(51) Int. Cl.
*G06F 7/00* (2006.01)
*G06F 17/30* (2006.01)

(52) U.S. Cl. ........................................ 707/797; 707/803
(58) Field of Classification Search .................. 707/100, 707/101, 103 R, 103 Y, 797, 803
See application file for complete search history.

(56) References Cited

U.S. PATENT DOCUMENTS

| | | | | |
|---|---|---|---|---|
| 5,058,002 A * | 10/1991 | Nakamura et al. | ................ | 707/1 |
| 5,089,952 A * | 2/1992 | Bozman | ........................ | 710/200 |
| 5,123,104 A * | 6/1992 | Levine et al. | ..................... | 707/1 |
| 5,283,894 A * | 2/1994 | Deran | ............................... | 707/1 |
| 5,430,869 A * | 7/1995 | Ishak et al. | ..................... | 707/101 |
| 5,495,609 A * | 2/1996 | Scott | ................................. | 707/8 |
| 5,546,571 A * | 8/1996 | Shan et al. | ........................ | 707/3 |
| 5,644,763 A * | 7/1997 | Roy | .............................. | 707/101 |
| 5,717,919 A * | 2/1998 | Kodavalla et al. | ................ | 707/8 |
| 5,758,149 A * | 5/1998 | Bierma et al. | ..................... | 707/8 |
| 5,924,094 A * | 7/1999 | Sutter | ............................... | 707/10 |
| 6,470,360 B1 * | 10/2002 | Vaitheeswaran | .............. | 707/205 |
| 6,571,250 B1 * | 5/2003 | Hara | ............................... | 707/101 |
| 7,174,331 B1 * | 2/2007 | Luo et al. | .......................... | 707/8 |
| 7,363,284 B1 * | 4/2008 | Plasek et al. | ...................... | 707/1 |
| 7,370,055 B1 * | 5/2008 | Pande | ............................ | 707/101 |
| 2005/0171960 A1 * | 8/2005 | Lomet | ............................ | 707/100 |

OTHER PUBLICATIONS

Graefe, Goetz; "B-tree indexes for high update rates", Special Interest Group on Management of Data (SIGMOD) Record, vol. 35, No. 1 (Mar. 2006), ACM, pp. 39-44, 2006.*

* cited by examiner

*Primary Examiner* — James Trujillo
*Assistant Examiner* — Marc Somers
(74) *Attorney, Agent, or Firm* — Robert P. Marley

(57) ABSTRACT

Various approaches for processing a B+ tree data structure are described. In one approach, in a first transaction a first insert operation to a first data page of a first index page in the B+ tree data structure is detected, and then it is determined whether performing the first insert operation would block a second insert operation in a second transaction concurrent with the first transaction. At least one empty second data page is created in response to determining that the second insert operation would be blocked by the first insert operation. The B+ tree data structure is updated to include the at least one second data page in the B+ tree data structure, and the updated index pages and second data page are committed to retentive storage. Thereafter, the first insert can be completed.

4 Claims, 9 Drawing Sheets

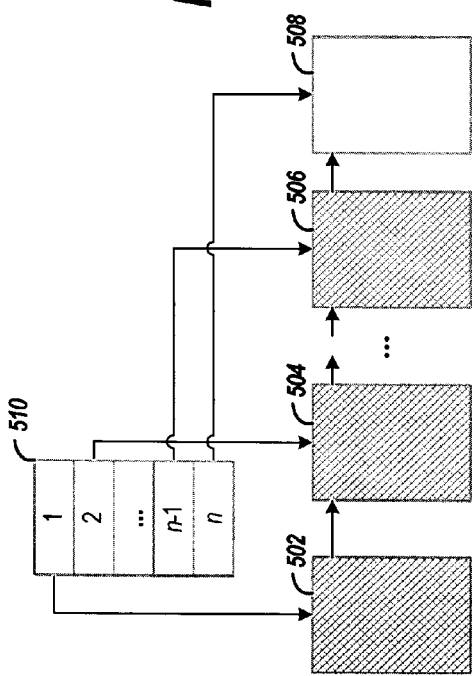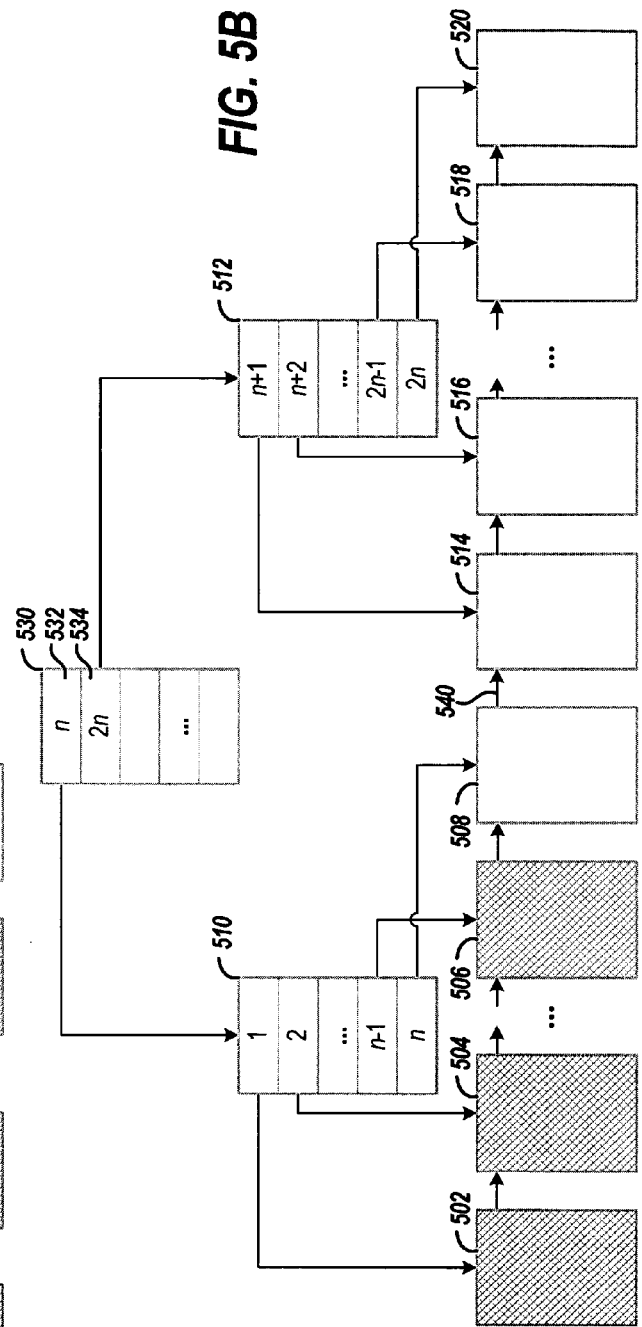

DYNAMIC PRECONDITIONING OF A B+ TREE

FIELD OF THE INVENTION

The present invention generally relates to data structures for a database management system.

BACKGROUND

Relational databases generally require that every record be uniquely identified by one or a combination of columns. The one or more columns that uniquely identify records is declared to be the primary key (PK) of the table.

A B+tree data structure is often used to manage database records. In an example implementation, nodes that are leaves of the B+tree are data pages of database records, and nodes that are parents of the leaves are index pages. The index pages contain primary key values for referencing records in the data pages. The leaves are sequentially linked to provide sequential access to database records.

In some applications a database management system (DBMS) can generally insert records into the database tables with no concurrency problems. For example, for a pre-assigned key such as a social security number (SSN), the order in which records keyed on the SSNs are presented for insertion into the database may be random. Thus, the random order in which pages are inserted into the B+tree minimizes concurrency issues.

In other applications, the primary key may be generated as a monotonically increasing value (e.g., 1, 2, 3) and data records inserted sequentially, which may restrict concurrency in some DBMSs. Some DBMSs cannot handle concurrent inserts of sequential records because the records are logically inserted on the right-most page of the B+tree, and the selected database recovery approach uses page level recovery rather than record level recovery. Thus, no more than one transaction at a time can insert a value to a given page.

Where restrictions on concurrency may pose a problem, a user may insert dummy records and then delete the records to create the index and data pages for later use in sequentially inserting legitimate records. The insertion and deletion of dummy records permits subsequent concurrent inserts because each subsequent insert will be directed to be stored on a different empty data page. However, inserting and deleting the required dummy records may be time consuming, error prone, and cause different performance and scaling problems.

A method and system that address these and other related issues are therefore desirable.

SUMMARY

The various embodiments of the invention provide methods and systems for processing a B+ tree data structure for data records of a database. In one embodiment, a DBMS detects in a first transaction a first insert operation to a first data page of a first index page in the B+ tree data structure and then determines whether performing the first insert operation would block a second insert operation in a second transaction concurrent with the first transaction. At least one empty second data page is created in response to determining that the second insert operation would be blocked by the first insert operation. One or more index pages in the B+ tree data structure are updated to include the at least one second data page in the B+ tree data structure. The updated one or more index pages and at least one second data page are committed to retentive storage. Data specified in the first transaction is written to the first data page after committing the one or more index pages. The first data page is committed to retentive storage after writing the data to the first data page.

In another embodiment, an apparatus is provided for processing database operations. The apparatus comprises means for establishing a B+ tree data structure in a memory for data records of a database. The apparatus also includes means for determining whether performing a first insert operation to a first data page of a first index page of the B+ tree data structure would block a second insert operation in a second transaction concurrent with the first transaction. Also provided is means for allocating at least one empty second data page in response to determining that the second insert operation would be blocked by the first insert operation, and means for modifying one or more index pages in the B+ tree data structure to include the at least one second data page in the B+ tree data structure. The apparatus also comprises means for committing the modified one or more index pages and at least one second data page to retentive storage, means for modifying the first data page with data specified in the first transaction after committing the one or more index pages, and means for committing the first data page to retentive storage after writing the data to the first data page.

Another embodiment is a database management system that comprises a processor arrangement, a memory, and a mass storage arrangement. The memory is configured with instructions executable by the processor arrangement for processing a B+ tree data structure for data records of a database. The mass storage arrangement is coupled to the memory for retentive storage of the B+ tree data structure. The processor arrangement, in executing the instructions, determines whether performing a first insert operation in a first transaction to a first data page of a first index page would block a second insert operation in a second transaction concurrent with the first transaction. The processor arrangement generates at least one empty second data page in response to determining that the second insert operation would be blocked by the first insert operation, and then links one or more index pages in the B+ tree data structure to the at least one second data page in the B+ tree data structure. The one or more index pages and the at least one second data page is committed to the mass storage arrangement. The processor arrangement writes data specified in the first transaction to the first data page after committing the one or more index pages, and commits the first data page to the mass storage arrangement after writing the data to the first data page.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which:

FIG. 5A shows the state of a database B+tree with all of the data pages of an index page being full;

FIG. 5B shows the state of the B+tree of FIG. 5A after it has been dynamically preconditioned in accordance with various embodiments of the invention;

DETAILED DESCRIPTION

Figure 1:
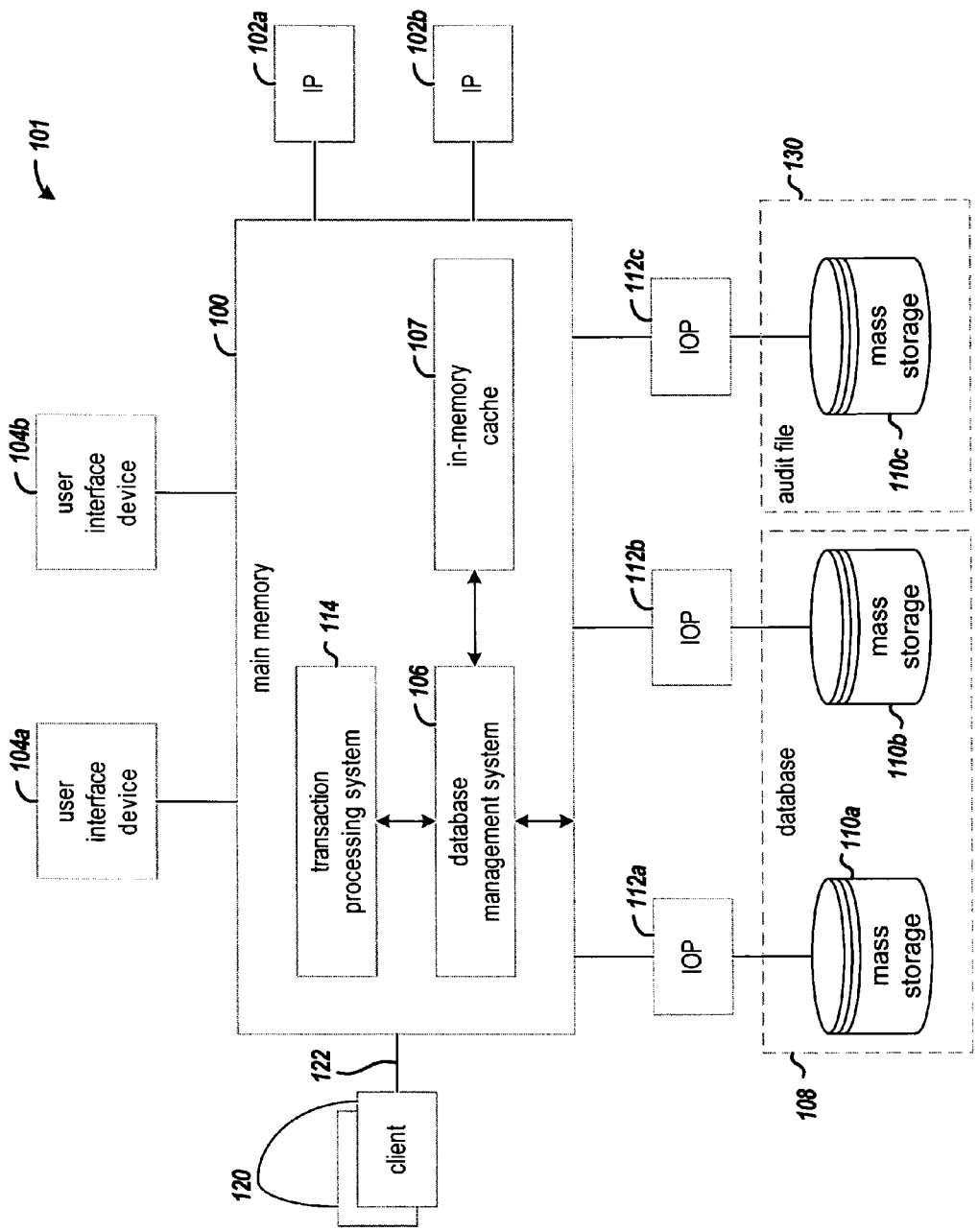
FIG. 1 is a block diagram of an example data processing system in which various embodiments of the invention may be implemented.

FIG. 1 is a block diagram of an example data processing system 101 in which various embodiments of the invention may be implemented. The example system illustrates a large-scale data processing system with multiple instruction processors (IPs) 102a and 102b. However, those skilled in the art will recognize that other types of data processing systems, such as a personal computer or a workstation may be used. The system includes a main memory 100 that is coupled to one or more IPs 102a and 102b. The memory may also be directly or indirectly coupled to one or more user interface devices 104a and 104b, which may include dumb terminals, personal computers, workstations, sound or touch activated devices, cursor control devices such as mice, printers, or any other known device used to provide data to, or receive data from, the data processing system.

A database management system (DBMS) 106 is resident main memory 100 and executes on IPs 102a and 102b to manage and provide access to a database 108 (shown dashed). The database may be stored on an arrangement of one or more mass storage devices 110a and 110b. Mass storage devices may be hard disks or any other suitable type of non-volatile or semi non-volatile device. These mass storage devices may be configured as a Redundant Array of Independent Disks (RAID). As known in the art, this configuration provides a mechanism for redundantly storing multiple copies of the same data on multiple hard disks to improve efficient retrieval of the data, and to increase fault tolerance. Battery back up may be provided, if desired. The transfer of data between mass storage devices and DBMS is performed by Input/Output Processors (IOPs) 112a and 112b.

A transaction processing system 114 may be coupled to DBMS 106. The transaction processing system receives queries for data stored within database 108 from one or more users. Transaction processing system 114 formats the queries and then passes them to DBMS 106 for processing. DBMS 106 processes the queries by retrieving data records from, and storing data records to, the database 108.

The system of FIG. 1 may further support a client/server environment. In this case, one or more clients 120 are coupled to data processing system 101 via a network 122, which may be the Internet, an intranet, a local area network (LAN), wide area network (WAN), or any other type of network known in the art. Some, or all, of the one or more clients 120 may be located remotely from data processing system.

For purposes of database recovery, the DBMS may log data to the audit file 130 (or "audit trail"). With each processed transaction, the DBMS may write to mass storage 110c data that describes updates to one or more pages of data of the database. If recovery of the database is required, the records in the audit file may be used to reconstruct the database.

Figure 2:
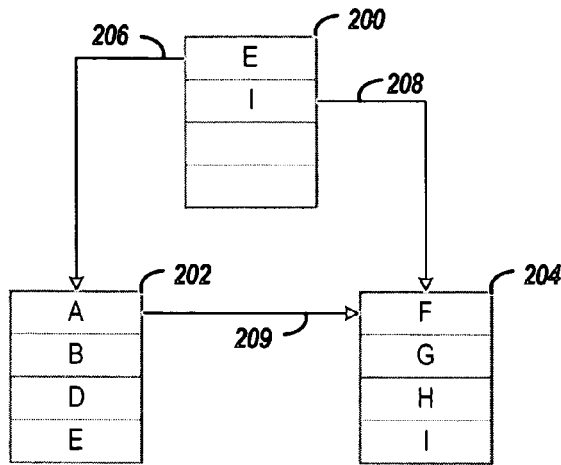
FIG. 2 is an example of a B+tree structure that may be used to represent a database table.

FIG. 2 is an example of a B+tree structure that may be used to represent a database table. In the illustrated B+tree structure only the leaf nodes contain data records and the leaf nodes are sequentially linked. In another embodiment, a B–tree may be employed wherein data records are stored in both the non-leaf and the leaf nodes. The following discussion regarding the B+tree of FIG. 2 illustrates the manner in which a sequence of records is appended to a tree according to prior art practices.

The tree of FIG. 2 includes a non-leaf node 200 and two leaf nodes 202 and 204, which are children of non-leaf node 200. Generally, non-leaf nodes store index values and pointers identifying the child nodes. For example, non-leaf node 200 stores a pointer 206 and an index value "E" that identifies leaf node 202. Similarly, the non-leaf node stores a pointer 208 and an index value "I" identifying leaf node 204. Pointers 206 and 208 may each be an address, an offset, or any other type of indicia that uniquely identifies, and allows for efficient traversal to, a selected one of the leaf nodes. The index values specify the key of the last record stored in the referenced leaf nodes. For example, index "E" indicates that any records having index values between the first index value, "A", and "E" will be located on leaf node 202, and any records having an index value after "E" but before, and including, "I" will be stored on leaf node 204. In another embodiment, non-leaf node 200 could store the index value for the first, rather than the last, record within the respective leaf node.

As discussed above, because the illustrated tree is a B+tree, the non-leaf nodes do not store the actual data records. Those records are only stored on the leaf nodes. For example, leaf node 202 stores records A-E. Similarly, leaf node 204 stores records F-I. These records are stored within the leaf in a sort order dictated by the index values "A", "B", "C", and etc. These index values provide searchable data that are used to access a desired record. One or more index values may be used to arrange the records within a sort order. A primary and/or secondary key value may be used as an index value. As is known in the art, primary and secondary keys are searchable values identifying a record. In some embodiments, the primary key is used to uniquely identify a record. In other embodiments wherein each primary key value is not unique, some other mechanism such as a row identifier is used to uniquely identify each record.

In the tree of FIG. 2, leaf node 202 may store a pointer 209 to leaf node 204. This pointer may be an address or some other indicia that allows a sequential traversal of database records without traversing the index nodes of the tree. If desired, reverse pointers may be provided. For example, a pointer may be stored in leaf node 204 pointing to leaf node 202.

When non-leaf and leaf nodes are created, each of these nodes is allocated a predetermined amount of storage space by DBMS 106. The predetermined amount of storage space allocated to a node corresponds to a page of a file. The page size is usually based on the architectural characteristics of the underlying file system. For example, if the file system manages memory in 1792-byte portions, the selected page size may be some multiple of 1792. A database administrator may select the size of the page, for instance. In one embodiment, the leaf nodes are the same size as the non-leaf nodes. In an alternative embodiment, the leaf nodes may be larger than the non-leaf nodes, or vice versa. In any event, DBMS 106 and any database application accessing the database are aware of the size of the leaf and non-leaf nodes.

The following scenario describes the sequential insertion of records in a database and the concurrency limitations that may arise. In sequentially adding records to the database, records having key values A, B, D, E, F, G, H, and I are inserted in order. Note that the tree illustrates the state of the database after all the records have been added. Backing up to the time when record I is inserted, when the record having an index value of I is to be inserted in tree, root node 200 is searched to determine that the last record on node 204 has the index value I. Therefore, pointer 208 will be used to locate node 204, to store the new record. After searching the records of node 204, the insertion point for the new record is located after the record having an index value of H. Since node 204 has adequate space to accommodate this new record, the store operation is performed. During these update procedures, the pages corresponding to nodes 200 and 204 are locked to prevent two software transactions from attempting to update the same records at once. According to prior art methods of adding the sequence of records to the B+tree, the locking of the pages corresponding to nodes 200 and 204 is accomplished by activating an exclusive lock operation on those pages. This type of operation prohibits any other transaction from reading from, or writing to, these nodes until the insert transaction is committed, for example, by creating an audit trail of the transaction in the mass storage arrangement 130.

It may be noted that in some cases, the located leaf node will not have enough space to store a new record. For example, once record I is inserted, node 204 will not have enough storage space available for a record J. In this situation, another leaf node must be created. This node is added to the tree by updating parent node 200 to include a pointer to the new leaf node. Additionally, pointers are updated and/or created at the leaf-node level to link the new node to one or more adjacent leaf nodes. For example, if a new leaf node is inserted between nodes 202 and 204, pointer 209 is updated to point to this new node. A pointer is also created within the new leaf node to point to leaf node 204. In this type of situation, all nodes associated with these operations must be locked during the update operation. For example, if node 202 is being updated to include a pointer to a newly created leaf node, the page corresponding to node 202 must be locked until the transaction is committed by creation of an audit trail entry.

In the scenario described above, appending a sequence of records to a database can be particularly time consuming because concurrency is limited by a sequence of updates to the index page (e.g., 200).

To address the problems associated with the storing of a sequence of records to a database, some DBMSs utilize record-level locking during audit trail creation. Returning to the foregoing illustration, these systems lock only the records within nodes 200 and 204 that are being updated with the new index value and data, respectively, instead of locking an entire page corresponding to a node. This allows a concurrent request to store a record to the same leaf node that stores the previous record while the audit trail entry for that previous record is still under creation. However, this type of record-level locking substantially affects performance when system recovery must be performed after a failure occurs. This is because operations specified in each of the audit trail entries must be applied to a saved copy of the database in the correct sequence, one at a time. In contrast, when page-level locking is performed, an entire page may be recovered using a single copy operation.

The various embodiments of the invention provide dynamic preconditioning of a B+tree without explicit user intervention, thereby promoting a greater level of concurrency. Generally, while processing an insert to the database, the DBMS determines whether a state of the database would limit concurrency while records are added sequentially. In response to determining the limited concurrency, the DBMS initiates a nested transaction and creates a selected number of empty data pages, and index pages if needed, for use during sequential inserts. The index page(s) and empty data pages are committed to the database prior to continuing with processing of the insert operation that triggered the preconditioning.

This means that a rollback of the transaction that triggered preconditioning would not affect the updates made during preconditioning. Preconditioning can therefore be thought of as a nested transaction. The commit of this nested transaction involves writing the updated pages to the log (also referred to as an audit trail). It may also, depending on implementation objectives, involve writing the updated pages to the database file.

Figure 3:
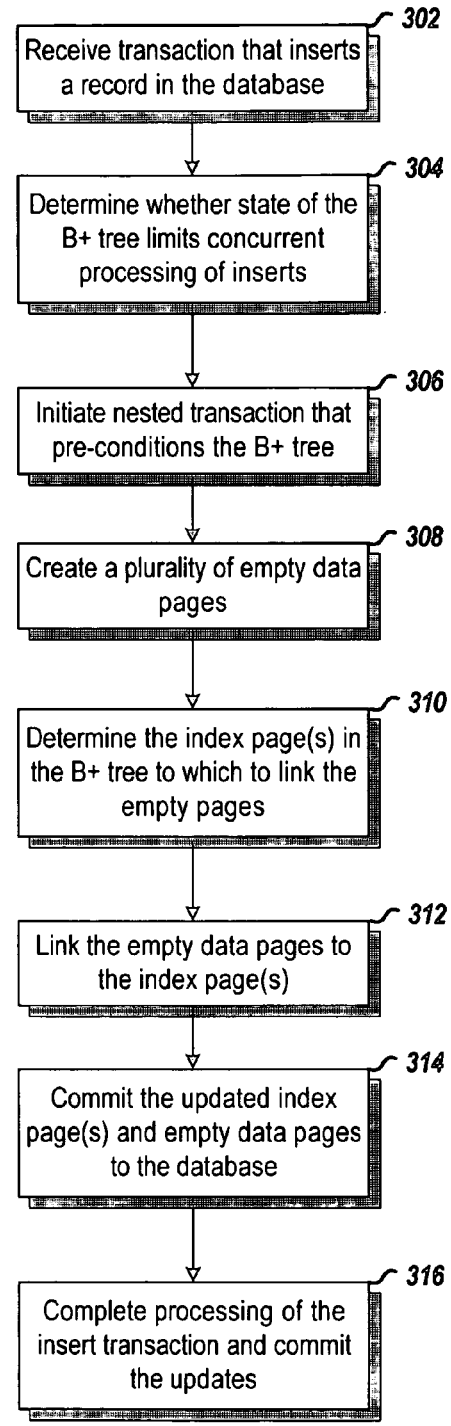
FIG. 3 illustrates a process for dynamically pre-conditioning a B+tree in accordance with various embodiments of the invention.

FIG. 3 illustrates a process for dynamically pre-conditioning a B+tree in accordance with various embodiments of the invention. Without user intervention and in the midst of processing an insert of a record to the database, the various embodiments of the present invention dynamically precondition the B+tree to accommodate concurrency in sequential inserts to the database. The DBMS receives a transaction that inserts a record in the database (step 302), and in response, determines whether the state of the database would limit concurrent inserts (step 304).

In response to finding the database in a state that limits insert concurrency, and knowing the pattern of the primary key sequence, the DBMS initiates a nested transaction to precondition the B+ tree before processing the triggering insert operation (step 306). In general, a plurality of empty data pages are created (step 308). The manner in which empty data pages are created or allocated relies on the same facilities as the DBMS uses to allocate a new data page when insertion of a data record requires a new data page. For example, the underlying file management system may be called upon to allocate additional storage to the database table. Instead of writing data to the allocated data pages, the data pages remain empty for use by concurrent insert operations after preconditioning completes.

The index page or pages in the B+tree to which the empty data pages are to be linked are determined based on the state of the database (step 310). The pattern of the primary key sequence (as discussed further in the scenarios below) generally refers to whether records are strictly inserted in key sequential order, whether the database has divisions and the records are inserted in key sequential order within each division, or whether records are inserted in random key order. The DBMS may be told the pattern of the primary key sequence by way of the database definition or it may discover the pattern. For example, the key column may be declared or defined as an IDENTITY column or as a SEQUENCE. IDENTITY and SEQUENCE are example designations used in the standard query language (SQL) to identify that key values are to be generated by the DBMS or by the application in sequential order. Another table attribute, such as a partitioned table, or a table defined with a multi-column key (which indicates a division), might indicate that the key values are to be generated by the DBMS or by the application in sequential order within each partition (division). The absence of these table attributes might indicate that the key values are random. Alternatively, by monitoring or sampling the key values in the table, the DBMS may determine the pattern of the primary key sequence. The discussion and the scenarios below illustrate applying various embodiments of the invention to key values that are generated sequentially, generated sequentially within a division, or generated randomly. These scenarios are not intended to limit the applicability of the invention, but to illustrate three embodiments.

The empty data pages are linked to the one or more index page(s) (step 312), and the updated index page(s) and empty data pages are committed to the database (step 314). Committing the pages to the database may be accomplished by writing log records that specify the page updates to an audit file in retentive mass storage. Alternatively, or additionally, the updated pages may be written to the database tables in retentive mass storage. After the empty data pages and updated index page(s) have been committed, the nested transaction is complete and the B+tree has effectively been preconditioned to allow concurrent sequential inserts.

Following completion of the nested transaction, the insert that triggered the nested transaction may be processed (step 316).

Various scenarios in which the DBMS dynamically preconditions the B+tree are described in the following figures. Each scenario generally refers to information the database management system determines regarding the structure of the database table and regarding the primary key values that are generated as records are inserted into the table. The following description describes the process steps associated with the nested transaction for performing the dynamic preconditioning based on the particular state.

Figure 4A:
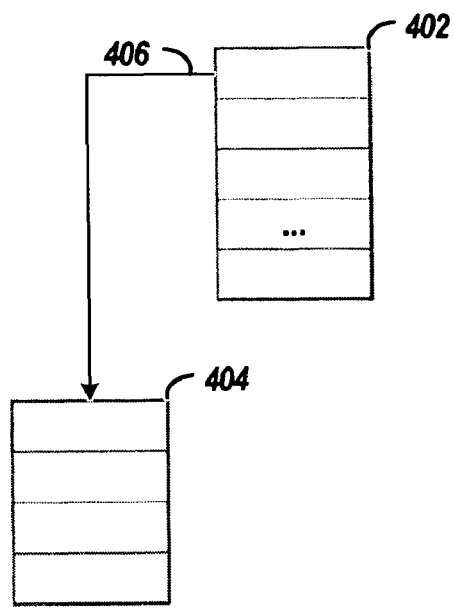
FIG. 4A shows the state of a B+tree before any records have been inserted.
Figure 4B:
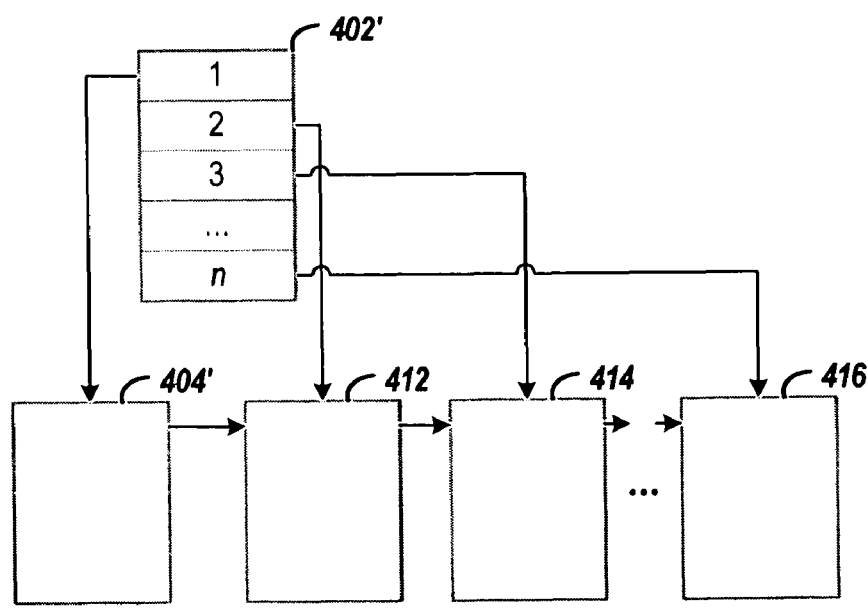
FIG. 4B shows the state of the B+tree of FIG. 4A after it has been dynamically preconditioned in accordance with various embodiments of the invention.

FIGS. 4A and 4B illustrate a scenario in which records are sequentially inserted at the end of a database table. FIG. 4A shows the state of a database B+tree before any records have been inserted in a database. The index page 402 is linked to a single empty data page 404. FIG. 4B shows the state of this B+tree after it has been dynamically preconditioned in accordance with various embodiments of the invention.

The dynamic preconditioning illustrated by FIGS. 4A and 4B is triggered when an insert operation is detected by the DBMS, the inserts are in key-sequential order, and the database is initially empty. An insert operation is identified by the DBMS by way of an operation code specified in a transaction, for example. When the database is empty, as shown in FIG. 4A, the index page 402 does not contain a key and has a pointer 406 to an empty data page 404. Since the database is empty, the lone empty data page 404 is both the leftmost and rightmost page referenced by the index page 402.

With an empty database table and without application of the present invention, creation of an empty B+ Tree results in only a single index page and a single data page. Because there is only one empty data page and assuming page-level locking, concurrent inserts would not be allowed because either the data page would be locked for an insert of multiple records to the data page or the index page would be locked for inserts of one record per data page.

To allow multiple transactions to concurrently insert records in accordance with one embodiment, each data page is limited to storing only one record. The first insert into the B+tree triggers preconditioning. Preconditioning, as shown in FIG. 4B, creates as many child data pages as the index page can support (shown as n). The key values of the records on the index page 402' reflect the sequence specified by the database definition, e.g., 1, 2, 3, . . . . The data pages 404', 412, 414, . . . 416 are linked together and contain no records.

Table 1 describes the steps of the nested transaction for performing the dynamic preconditioning for the example illustrated in FIGS. 4A and 4B.

TABLE 1

Begin nested transaction.
Calculate the number of key values which can fit onto an index page, i.
Get the first number in the sequence, s and the increment value, c.
Acquire i − 1 data pages (there is an initial data page in the B+ Tree) and
    link them together.
Set the first data page's high value h to the first key value s.
Populate the existing empty index page with records:
FOR rec_count := 1 TO i DO
   insert index record with key value h
   h := h + c
   Link new index record to corresponding data page.
END FOR
Commit nested transaction.

FIGS. 5A and 5B illustrate a scenario that is a variation of the scenario of FIGS. 4A and 4B where some records have already been inserted in the B+tree. FIG. 5A shows the state of a database B+tree with the data pages 502, 504, 506 of index page 510 being full, as designated by the cross-hatching, and an insert to data page 508 triggering pre-conditioning. FIG. 5B shows the state of the B+tree after it has been dynamically preconditioned in accordance with various embodiments of the invention.

The dynamic preconditioning illustrated by FIGS. 5A and 5B is triggered when an insert operation is detected by the DBMS, the inserts are in key-sequential order, and the insert is to the right-most data page.

Without application of the present invention and in a scenario wherein the rightmost index page is full, an insert would result in the addition of a new root index page and another new index page to accommodate additional data pages. Concurrent inserts would not be allowed for the reasons set forth above for FIGS. 4A and 4B.

To allow multiple transactions to concurrently insert records in accordance with one embodiment, each data page is limited to storing only one record. An insert into the B+tree triggers preconditioning when the rightmost index page is full. In another embodiment, the preconditioning may also be used where multiple records are stored on a data page. Preconditioning in this scenario initiates a nested transaction that creates a new index page 512 and as many child data pages 514, 516, 518, and 520 as the index page can support (shown as n). The key values of the index records on the new index page 512 continue the sequence. Once these pages have been created, they are linked into the B+tree by updating the higher level index page to point to the newly created index page 512, and by updating the rightmost data page 508 of the existing B+tree to point, via link 540, to the leftmost data page 514 of the new empty data pages. In the example of FIGS. 5A and 5B, a new root index page 530 is also created to replace index page 510 as the root and to reference both index pages 510 and 512. The first entry 532 is updated with the key value n to refer to the last key of the last data page referenced by index page 510, and the second entry 534 is updated with the key value 2n to refer to the last key value of the last data page referenced by index page 512.

The nested transaction is completed by a commit operation. The commit of the nested transaction writes to an audit file in a mass storage arrangement data that describes the new index pages 512, and 530, the new empty data pages 514, 516, 518, and 520, and the key values and links stored in the new pages. Data page 508 is written to the audit file as well because of its new link 540 which connects the old and new data pages. The updates may also be applied to the database file in a mass storage arrangement. After the nested transaction commit processing completes, the DBMS may proceed with inserting the next data record.

Once the B+tree has been preconditioned, concurrent transactions can insert, without updating the index page 512, until all the empty data pages 514, 516, and 518 have been used. An insert to page 520 would trigger additional preconditioning.

Table 2 describes the steps of the nested transaction for performing the dynamic preconditioning for the example illustrated in FIGS. 5A and 5B.

TABLE 2

Begin nested transaction.
Calculate the number of key values which can fit onto an index page, i.
Get the first number in the sequence, s and the increment value, c.
Acquire a new index page.
Acquire i data pages and link them together.
Set the first data page's high value h to the first key value s.
Populate the new index page with records:
    FOR rec_count := 1 TO i DO
       insert index record with key value h
       h := h + c
       Link new index record to corresponding data page.
    END FOR
Link new subtree into existing B+ Tree in two steps:
    1) Link new index page into lowest level existing index page. In some cases a new parent must be created for the lowest, right-most index page and the new index page; and
    2) link the right-most data page of the existing B+ Tree to the left-most page of the new subtree.
Commit nested transaction.

Figure 6:
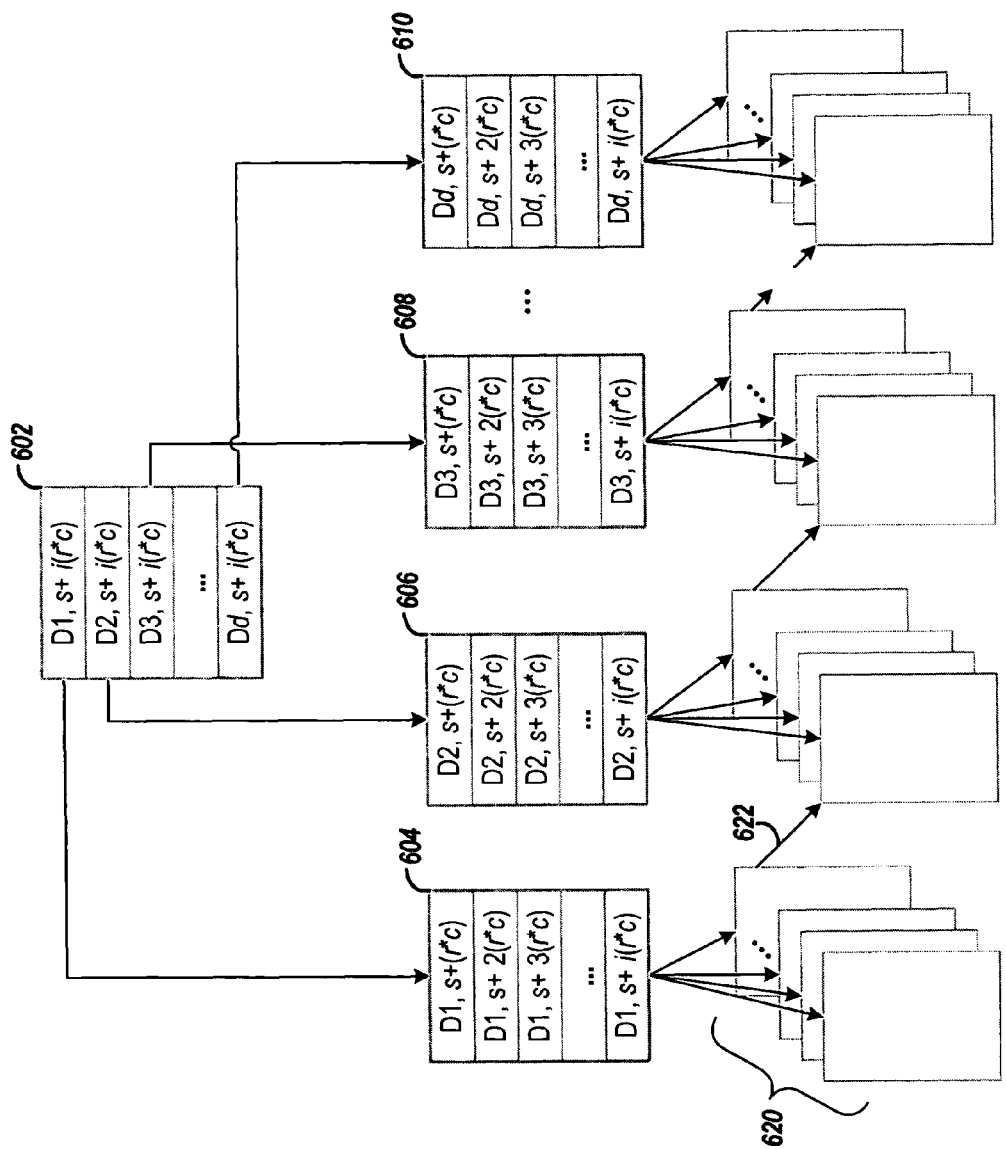
FIG. 6 illustrates a scenario in which an embodiment of the invention is applied to a database table that is divided into divisions.

FIG. 6 illustrates a scenario in which an embodiment of the invention is applied to a database table that is divided into divisions. Each division has its own sequence. An example is a medical records database where the primary key is a composite key (multiple columns) consisting of a patient number and a date-seen. In this example, the leading key column identifies the division and the date-seen column creates the sequence. The notation used in this scenario is Dx,y, where x is the division, and y the key value of a record within the division.

In the example scenario, the database table is initially empty as shown in FIG. 4A. There is one index page that is linked to an empty data page, and concurrent updates are not supported as explained. FIG. 6 illustrates the B+tree after preconditioning.

Dynamically preconditioning a database table having a composite key and records inserted in key-sequential order within a division does not require one data record per page as long as each division has its own set of data pages. If the divisions are accessed in a round-robin or other fashion and the transaction existence times are short enough to complete one insert before the next insert into the same division occurs, more than one record may be written to a data page. However, if collisions are likely to occur in inserting records to the same data page, the number of records on each data page must be limited to one as in the previous scenarios.

The first insert into the B+tree triggers preconditioning. If the DBMS determines that the database table is defined with a multi-column key (which indicates a division) and that key values are sequentially generated and records added in key-sequential order within each division, preconditioning of the B+tree may proceed with the initiation of a nested transaction. Preconditioning creates, for each division, as many child data pages as the index page can support. The key values of the records on the index page reflect the division sequence, for example in division D1 the key values may be D1, 1; D1, 2; D1, 3. The data pages are linked together but do not contain any records. The divisions are connected together to form a single B+tree.

The nested transaction is completed by a commit operation. The commit of the nested transaction writes to an audit file in a mass storage arrangement, data that describes the new index pages, the new empty data pages, and the key values and links stored in the new pages. The updates may also be applied to the database file in a mass storage arrangement. After the nested transaction commit processing completes, the DBMS may proceed with inserting the next data record.

The example of FIG. 6 illustrates a preconditioned B+tree for the case where multiple records may be written to a data page, and the key values in the index pages 602, 604, 606, 608, and 610 correspond to the variables used in the process steps set forth in Table 3. The number of divisions is d, the number of key values that can fit on an index page is i, the first key value in the sequence is s, the number of maximum-sized records that can fit in a data page is r, and the value by which the key values are incremented is c.

Each entry in the newly created index pages is linked to an empty data page. For example, for index page 604 there are i empty data pages 620. Each key value in the index page references the last key value possible on the linked empty data page. While not shown, it will be appreciated that the empty data pages under an index page are sequentially linked. The empty data pages from one division to another are also linked, as shown by link 622, for example.

The number of divisions may be maintained as part of the DBMS's statistical information about the table. This number may be calculated based on the data in the table, or determined by some other means. The number of divisions may also be variable or fixed. For example, if the leading column of the key is patient record number, the number of divisions is the number of unique patients. If the leading column of the key is month, the number of divisions is 12.

Table 3 describes the steps of the nested transaction for performing the dynamic preconditioning for the example illustrated in FIG. 6.

TABLE 3

Begin nested transaction.
Calculate the number, r, of maximum-sized records that can fit in a data page.
Calculate the number of key values which can fit onto an index page, i.
Calculate the number of divisions, d.
Get the first number in the sequence, s and the increment value, c.
For each of the d divisions, calculate the first data page's high value, h (each entry in the index is the high value on the associated child page), h = s + (r * c).
For each of the d divisions, acquire an index page. The existing index page, page 1, created when the table is created, forms the root of the B+ Tree and is the parent of the d index pages.
For each of the d divisions, acquire i data pages and link them together. (Note that there is one data page already created when the table is created, as shown in FIG. 4A, so the total number of acquired pages is
(d * i) − 1.)
Process the already-created data page along with the newly acquired data pages.
Populate each index page with records:
    FOR Dn := 1 TO d DO
       FOR rec_count := 1 TO i DO
          insert index record with key value Dn, h
          h := h + (r * c)
          Link new index record to corresponding data page.

TABLE 3-continued

```
        END FOR
    END FOR
Link page 1, the root of the B+ Tree, to the d index pages.
Commit nested transaction.
```

Figure 7A:
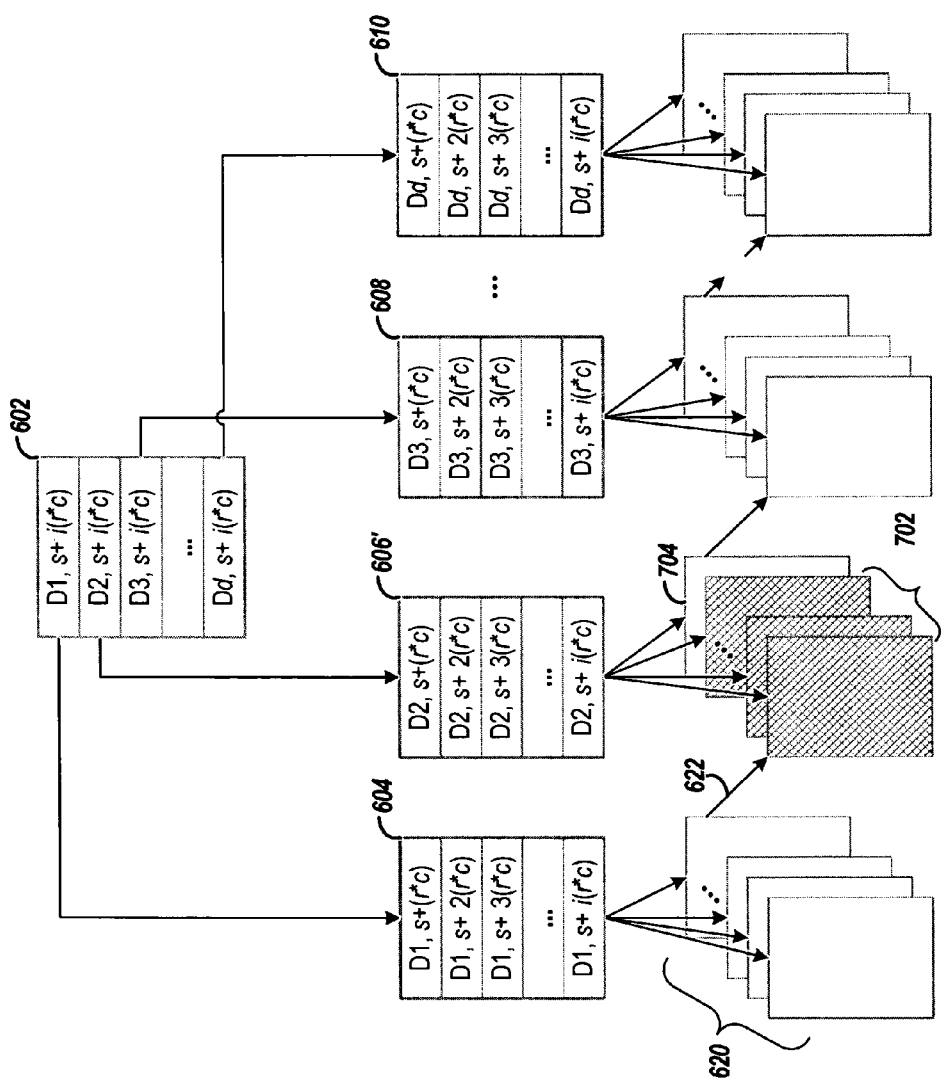
FIG. 7A shows the state of a database B+tree with all of the data pages of an index page being full.
Figure 7B:
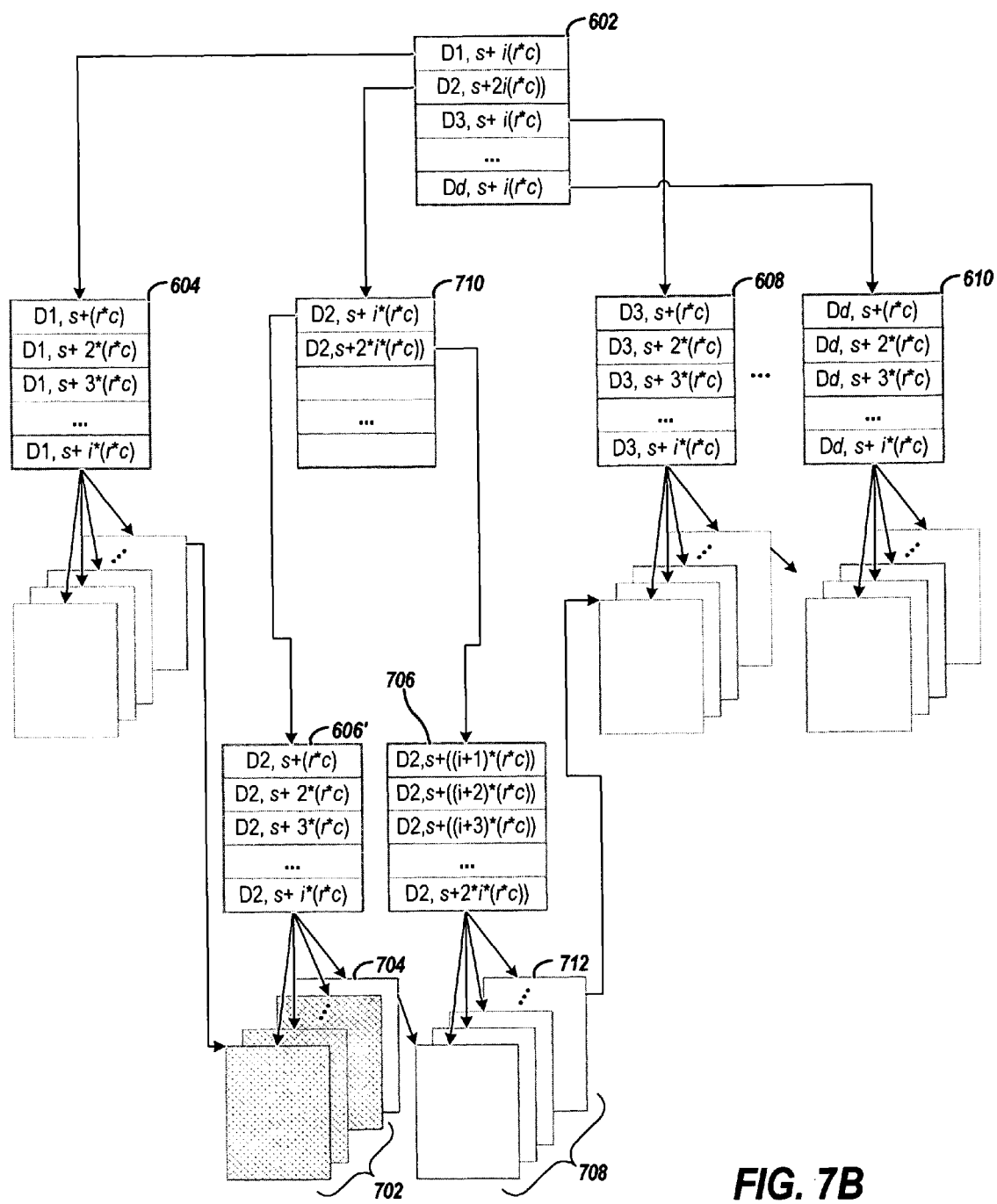
FIG. 7B shows the state of the B+tree of FIG. 7A after it has been dynamically preconditioned in accordance with various embodiments of the invention.

FIGS. 7A and 7B illustrate a scenario that is a variation of the scenario of FIG. 6 where some records have already been inserted in the B+tree and an insert is initiated to the last data page of a right-most index page of a division. FIG. 7A shows the state of a database B+tree with the data pages 702 of index page 606' being full, as designated by the cross-hatching, and FIG. 7B shows the state of the B+tree after it has been dynamically preconditioned in accordance with various embodiments of the invention.

The dynamic preconditioning illustrated by FIGS. 7A and 7B is triggered when an insert operation is detected by the DBMS, the inserts are in key-sequential order within a division, and the insert is to the last, or right-most, data page 704 within that division.

As with the other scenarios, the DBMS determines whether the database is in a state for preconditioning the B+tree in response to the initiation of a transaction that seeks to insert a record in the database. If the DBMS determines that the database table has divisions with records added in key-sequential order within each division, and the insert is to the last data page of the index page at which the insert is to occur, preconditioning of the B+tree may proceed with the initiation of a nested transaction.

A new index page 706 and child data pages 708 are created, and a new intermediate index page 710 is created for division D2 for linking the full index page 606' and the new index page 702 with the empty data pages 704 into the B+tree. It will be appreciated that once a record is to be inserted under division 2 in page 712, a new set of empty data pages may be created along with a new index page, and that new index page may be linked with existing index page 710, since index page 710 is not full.

The nested transaction is completed by a commit operation which writes data to an audit file to describe the updated pages. After the nested transaction commit processing completes, the DBMS may proceed with inserting the data record that triggered the preconditioning.

Table 4 describes the steps of the nested transaction for performing the dynamic preconditioning for the example illustrated in FIGS. 7A and 7B.

TABLE 4

```
Begin nested transaction.
Calculate the number of maximum-sized records which can fit onto a data
    page, r.
Calculate the number of key values which can fit onto an index page, i.
Get the next number in the sequence for this division, s and the increment
    value, c.
Calculate the next data page's high value, h for this division (each entry in
    the index is the high value on the associated child page),
    h = s + (r * c).
Acquire i data pages and link them together.
Acquire a new index page.
Populate the new index page with records:
    FOR rec_count := 1 TO i DO
        insert index record with key value dn, h
        h := h + (r * c)
        Link new index record to corresponding data page.
    END FOR
Link the new subtree into existing B+ Tree in two steps:
    1) Link new index page into lowest level existing index page. In
    some cases a new parent must be created for the lowest, right-
```

TABLE 4-continued

```
    most index page and the new index page; and
    2) link the right-most data page of the existing B+ Tree to the left-
    most page of the new subtree; and link the rightmost data page in
    the new subtree to its successor data page.
Commit nested transaction.
```

Figure 8:
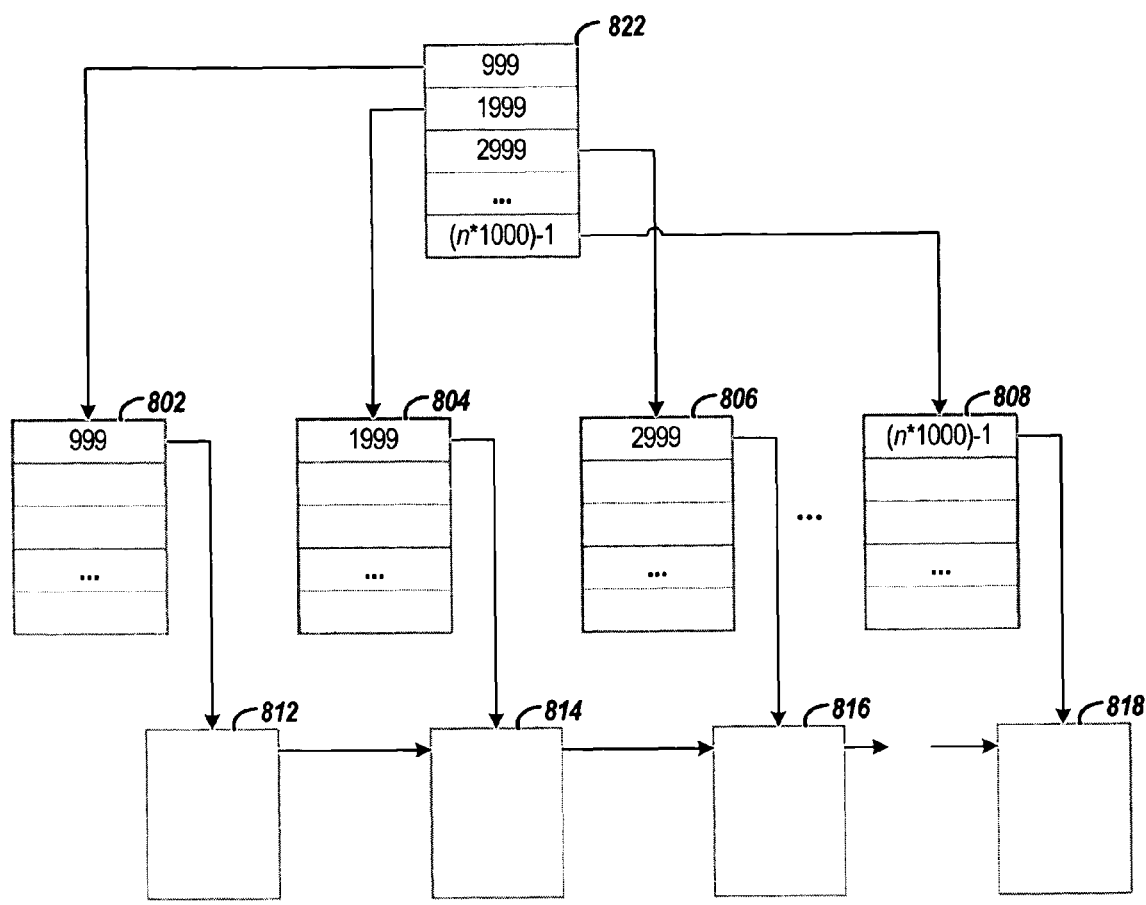
FIG. 8 illustrates a preconditioned B+tree for the case where the B+tree for an initially empty database table has been preconditioned for inserting records in random key order.

The example of FIG. 8 illustrates a preconditioned B+tree for the case where the B+tree for an initially empty database table has been preconditioned for inserting records in random key order. In the example scenario, the database table is initially empty as shown in FIG. 4A. There is one index page that is linked to an empty data page, and concurrent updates are not supported as explained. FIG. 8 illustrates the B+tree after preconditioning.

The first insert into an initially empty B+tree triggers preconditioning. In response to the DBMS determining that key values are randomly generated, preconditioning of the B+tree may proceed with the initiation of a nested transaction.

The preconditioning divides the domain of possible key values into a number of divisions. The number of divisions could, for example, be the maximum number of records that fit on an index page. The domain is the possible set of values for a given column. For example, if the column definition contains "CHECKS BETWEEN 0 and 9999" the possible key values are between 1 and 9999. Or when the data type is "NUMERIC (4,0)" the key may have values between −9999 and 9999. Since use of negative key values is rare, the negative values may be ignored for purposes of preconditioning. For a key range of 0-9999, ten divisions having key values of 999; 1999; . . . 9999 may be used. Each division has a single index page, as illustrated by index pages 802, 804, 806, and 808. Each division further has a single empty data page, illustrated by data pages 812, 814, 816, and 818. The root index page 822 is updated to contain the key values corresponding to the divisions and linked to the index pages 802, 804, 806, and 808. As with the previous scenarios, if collisions might occur when writing to a data page, the number of records per data page must be limited to one. This example illustrates the case where multiple data records can be written to a data page without collisions.

The nested transaction is completed by a commit operation which writes data to an audit file to describe the updated pages. After the nested transaction commit processing completes, the DBMS may proceed with inserting the data record that triggered the preconditioning.

Table 5 describes the steps of the nested transaction for performing the dynamic preconditioning for the example illustrated in FIG. 8.

TABLE 5

```
Begin nested transaction.
Calculate the number of maximum-sized records which can fit onto a data
    page, r.
Calculate the number of divisions, d.
Get the first number in the sequence, s and the increment value, c.
For each of the d divisions, calculate the first data page's high value, h
    (each entry in the index is the high value on the associated child
    page), h = s + (r * c).
For each of the d divisions, acquire an index page. The existing index
    page, page 1, created when the table is created, forms the root of
    the B+ Tree and is the parent of the d index pages.
For each of the d divisions, acquire a data page and link them together.
    Note that there is one data page already created when the table is
    created so the total number of acquired pages is (d * i) − 1. Process
    the already-created data page along with the newly acquired data
    pages.
```

TABLE 5-continued

Populate each index page with one record:
    FOR Dn := 1 TO d DO
        insert index record with key value h
        h := h + (r * c)
        Link new index record to corresponding data page.
    END FOR
Link page 1, the root of the B+ Tree, to the d index pages.
Commit nested transaction.

Figure 9A:
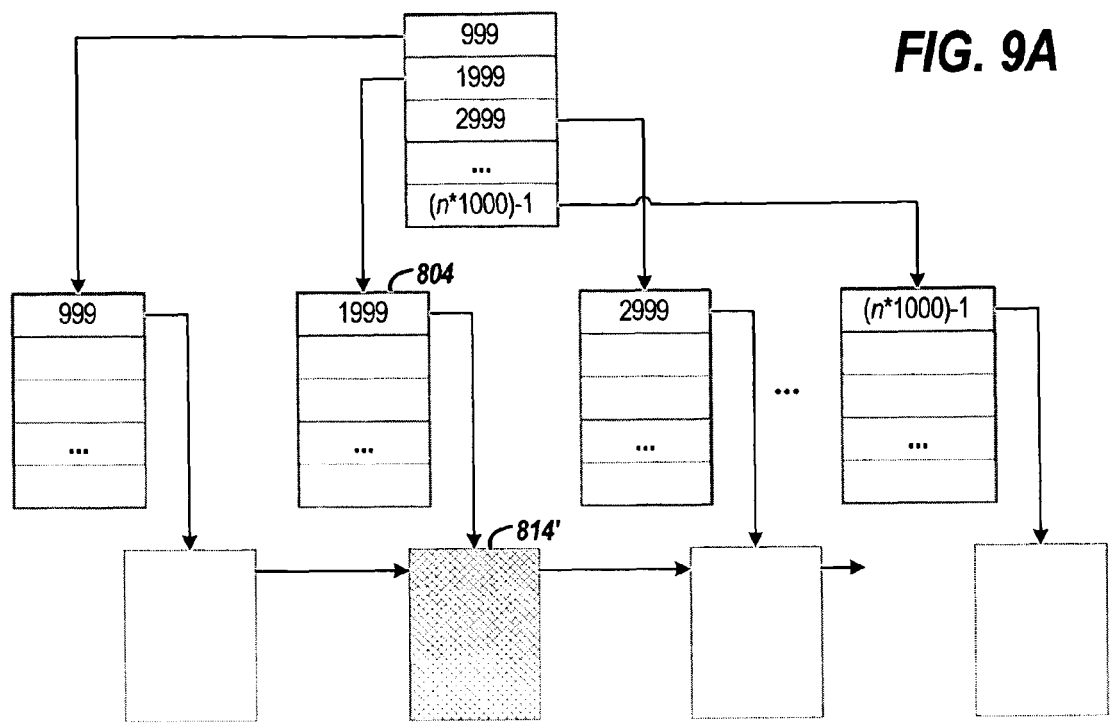
FIG. 9A shows the state of a database B+tree with a single data page of an index page being full.
Figure 9B:
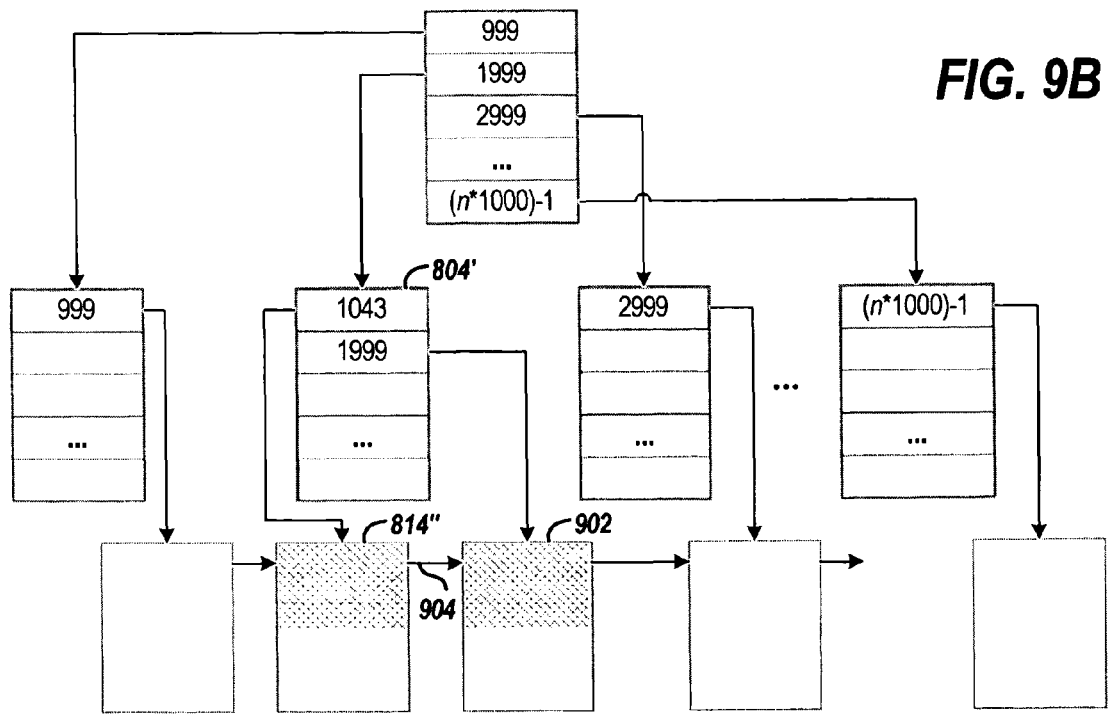
FIG. 9B shows the state of the B+tree of FIG. 9A after it has been dynamically preconditioned in accordance with various embodiments of the invention.

FIGS. 9A and 9B illustrate a scenario that is a variation of the scenario of FIG. 8 where some records have already been inserted in the B+tree and the data page in which a record is to be inserted is already full of data records. It may be recalled from the example of FIG. 8 that each data page holds multiple data records. FIG. 9A shows the state of a database B+tree with data page 814' of index page 804 being full, as designated by the cross-hatching. FIG. 9B shows the state of the B+tree after having been dynamically preconditioned in accordance with various embodiments of the invention.

The dynamic preconditioning illustrated by FIGS. 9A and 9B is triggered when an insert operation is detected by the DBMS, the inserts are in random key order, and the data page in which the record is to be inserted is full. As with the other scenarios, the DBMS determines whether the database is in a state for preconditioning the B+tree in response to the initiation of a transaction that seeks to insert a record in the database. If the DBMS determines that the key values are generated randomly and the data page in which the insert is to occur is full, preconditioning of the B+tree may proceed with the initiation of a nested transaction.

When the table contains a large number of data pages, the chance multiple transactions update different records on the same page may be relatively small. However, page splits will occasionally update the same index page and limit concurrency. To handle this, the page split is performed by preconditioning. This preconditioning happens before the transaction has updated the page. As shown in FIG. 9B, a new data page 902 is created, and the records from the old data page 814' are split between the old data page 814' to the new data page 902. A link 904 is created between the new data page 902 and the old data page 814'. The parent index page of the split index page is updated to reflect this page split. For example, index page 804 of FIG. 9A is updated to store key value 1043 as its first entry, as shown in index page 804' of FIG. 9B. The key value of 1043 pertains to the highest key value of a record in data page 814''. Index page 804' is further updated to store another entry having a key value of 1999, which is the highest possible key value for the division. The preconditioning updates are committed. The index page is now available for update by other transactions.

As with the previous scenarios, if collisions might occur when writing to the data page, the number of records per data page must be limited to one. This example illustrates the case where multiple data records can be written to a data page without collisions.

Table 6 describes the steps of the nested transaction for performing the dynamic preconditioning for the example illustrated in FIGS. 9A and 9B.

TABLE 6

Begin nested transaction.
Calculate the number of maximum-sized records which can fit onto a data
    page, r.
Acquire a new data page.
Calculate the page split point according to some method; for example,
    determine a split point where half the records remain on the original
    data page, and half the records move to the new data page.
Move the records after the split point to the new data page.
Determine the high record value on the original page following the split.
Link new data page into existing B+ Tree in two steps:
    1) Link new index page into lowest level existing index page. In
    some cases a new parent must be created for the lowest, right-
    most index page and the new index page; and
    2) link the right-most data page of the existing B+ Tree to the new
    data page; and link the new data page to its successor data page.
Commit nested transaction.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of systems that utilize B+trees. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for processing a B+ tree data structure for data records of a database, comprising:
    detecting in a first transaction a first insert operation to a first data page storing one data record, of a first index page in the B+ tree data structure, wherein the first insert operation references a right-most data page of the first index page, and the determining step includes determining whether a first set of conditions is present, the first set of conditions being that data records are added in key-sequential order to the database under the first index page and the first data page is the only data page referenced by the first index page, and in response to the first set of conditions being present:
    determining whether performing the first insert operation would block a second insert operation in a second transaction concurrent with the first transaction;
    creating at least one empty second data page storing one data record in response to determining that the second insert operation would be blocked by the first insert operation;
    updating one or more index pages in the B+ tree data structure to include the at least one second data page in the B+ tree data structure;
    committing the updated one or more index pages and at least one second data page to retentive storage;
    writing data specified in the first transaction to the first data page after committing the one or more index pages;
    committing the first data page to retentive storage after writing the data to the first data page;
    creating as the at least one empty second data page a plurality of empty data pages;
    updating the first index page with references to the plurality of empty data pages; and
    committing the plurality of empty data pages and the updated first index page to retentive storage.

2. The method of claim 1, wherein the determining step includes determining whether a second set of conditions is present, the second set of conditions being that data records are added in key-sequential order to the database, and the first data page is a last data page referenced by the first index page, and in response to the second set of conditions being present
- creating as the at least one empty second data page a plurality of empty data pages;
- creating a new second index page and a new third index page;
- updating the second index page with references to the plurality of empty data pages;
- updating the third index page with references to the first index page and the second index page; and
- committing the plurality of empty data pages and the second and third index pages to retentive storage.

3. A database management system, comprising:
- a processor arrangement;
- a memory coupled to the processor arrangement, the memory configured with instructions executable by the processor arrangement for processing a B+ tree data structure for data records of a database;
- a mass storage arrangement coupled to the memory for retentive storage of the B+ tree data structure;
- wherein the processor arrangement, in executing the instructions, determines whether performing a first insert operation in a first transaction to a first data page storing one data record, of a first index page would block a second insert operation in a second transaction concurrent with the first transaction, wherein the first insert operation references a right-most data page of the first index page, and the processor arrangement, in executing the instructions, determines whether a first set of conditions is present, the first set of conditions being that data records are added in key-sequential order to the database under the first index page and the first data page is the only data page referenced by the first index page, and in response to the first set of conditions being present the instructions cause the processor arrangement to:
  - generates at least one empty second data page storing one data record in response to determining that the second insert operation would be blocked by the first insert operation,
  - links one or more index pages in the B+ tree data structure to the at least one second data page in the B+ tree data structure,
  - commits the one or more index pages and at least one second data page to the mass storage arrangement,
  - writes data specified in the first transaction to a first data page after committing the one or more index pages,
  - commits the first data page to the mass storage arrangement after writing the data to the first data page;
  - allocates a plurality of empty data pages for the at least one empty second data page;
  - updates the first index page with references to the plurality of empty data pages;
  - commits the plurality of empty data pages and the updated first index page to retentive storage; and
  - writes the data specified in the first transaction to the first data page referenced by the first index page.

4. The system of claim 3, wherein the processor arrangement, in executing the instructions, determines whether a second set of conditions is present, the second set of conditions being that data records are added in key sequential order to the database, and the first data page is a last data page referenced by the first index page, and in response to the second set of conditions being present, the instructions cause the processor arrangement to
- allocate a plurality of empty data pages;
- allocated a new second index page and a new third index page;
- update the second index page with references to the plurality of empty data pages;
- update the third index page with references to the first index page and the second index page; and
- commit the plurality of empty data pages and the second and third index pages to the mass storage arrangement.

* * * * *